June 15, 1926.

E. H. W. WEIBULL 1,588,433

ANTIFRICTION ROLLER BEARING

Filed Jan. 22, 1921

Inventor
E.H.W.Weibull,
By Marks Clerk
Attys.

Patented June 15, 1926.

1,588,433

UNITED STATES PATENT OFFICE.

ERNST HJALMAR WALODDI WEIBULL, OF GOTTENBORG, SWEDEN, ASSIGNOR, BY MESNE ASSIGNMENTS, TO NYA NORDISKA KULLAGER AKTIEBOLAGET, OF GOTTENBORG, SWEDEN.

ANTIFRICTION ROLLER BEARING.

Application filed January 22, 1921, Serial No. 439,199, and in England February 11, 1920.

This invention relates to antifriction bearings and especially to rollers for roller bearings.

It is known in connection with antifriction roller bearings to make use of rollers which are self-adjusting, and have such a design that certain properties are brought into operation, such rollers all being of a symmetrical form relatively to a radial middle plane.

The object of this invention is to provide rollers, which are self-adjusting though they are not symmetrical relatively to any radial plane.

The invention consists in the provision of a roller having its center of gravity located at a point outside the geometrical center of the rolling body and having the radius of curvature of the operative shell longer than the radius of the largest cross section of the roller taken in a plane at right angles to the axis of revolution and of such a form that the moment of inertia with respect to the normal axis of revolution is larger than or equal to the moment of inertia, with respect to an axis in a plane at right angles to the said first named axis and through the geometrical center of the roller, viz, larger or equal to the moment of inertia with respect to an axis in a plane at right angles to the said axis and through the center of gravity of the roller, increased by the product of the mass of the roller and the square of the distance between the center of gravity and the geometrical center of the roller.

Figure 1:
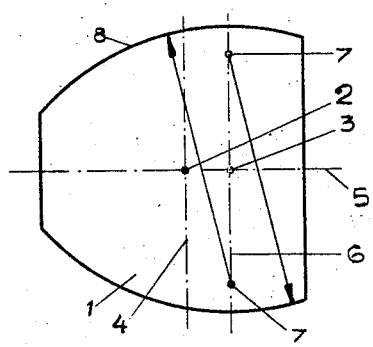
Figure 2:
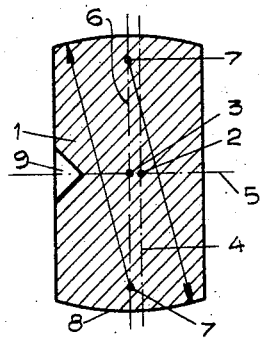

Two typical embodiments of such a roller are shown in the accompanying drawing, where, Fig. 1 shows an elevation of the one embodiment in a general form, and Fig. 2 a sectional view of the other embodiment in a specific form.

In the drawing 1 denotes the roller proper, 2 the center of gravity of the roller, and 3 the geometrical center of the roller, that is, the symmetrical point of the roller, if the nonsymmetrical portion of the roller is imagined as omitted, for instance, either cut away as in the embodiment shown by Fig. 1 or filled up as in the embodiment according to Fig. 2.

The square-sectional plane taken through the geometrical center 3 is denoted by 6. The geometrical center 3 is the point in which the axis of revolution 5 intersects the plane 6, which goes through the locus for the centers of curvature 7 of the rolling surface 8 of the roller 1.

In the embodiment according to Figure 1 an additional part of the roller is shown at the left hand side of the plane 6, and in the embodiment according to Figure 2 a central portion 9 is cut away at the left hand side of the roller which in its outer shape is symmetrical leaving a cavity in the body 1 of the roller, thus effecting the nonsymmetrical feature. In Figure 1 the center of gravity 2 is located at the left hand side of the geometrical center 3 and section plane 6, and in Figure 2 the first mentioned part is located at the right hand side of the last mentioned parts.

If $V_1$ 1 is the moment of inertia about the axis of rotation 5 for the roller $V_2$ the moment of inertia about an axis through the geometrical center 3 and in the plane 6 and $d$ the distance between the two centers 2 and 3 and $m$ the mass of the roller the following formula will suffice for the relation mentioned above $$V_1 = V_2 + md^2.$$

Having now particularly described and ascertained the nature of my said invention, and in what manner the same is to be performed, I declare that what I claim is:

A self adjusting roller for roller bearings, in which the centre of gravity does not coincide with the geometrical centre, and in which the radius of curvature of the axial generatrix of the working surface is longer than the radius of the largest circumference of the roller taken in a plane perpendicular to the axis of rotation of the roller and through the geometrical center of the roller, the moment of inertia in consideration of the normal axis of rotation of said roller being at least as large as the moment of inertia in consideration of an axis in a plane perpendicular to the axis of rotation and through the geometrical centre, or in other words, at least as large as the moment of inertia in consideration of an axis in a plane perpendicular to the axis of rotation and through the centre of gravity of the roller increased by the product of the mass of the roller and the square of the distance between the centre of gravity and the said geometrical centre of the roller.

In testimony whereof I have affixed my signature.

ERNST HJALMAR WALODDI WEIBULL.